United States Patent [19]
Laurent et al.

[11] Patent Number: 5,550,785
[45] Date of Patent: Aug. 27, 1996

[54] MOBILE SEISMIC SYSTEM OF GREAT LENGTH FOR WELLS

[75] Inventors: Jean Laurent, Orgeval; Patrick Meynier, Chatou; Jacques Cretin, le Chesnay; Claude Beauducel, Henonville, all of France

[73] Assignee: Institut Francais du Petrole, Rueil Malmaison, France

[21] Appl. No.: 75,805

[22] Filed: Jun. 14, 1993

[30] Foreign Application Priority Data

Jun. 12, 1992 [FR] France .................................. 92 07068

[51] Int. Cl.$^6$ .............................. G01V 1/40; G01V 3/26; E21B 47/00
[52] U.S. Cl. ............................ 367/25; 367/911; 181/102; 340/856.3
[58] Field of Search .......................... 340/855.1, 856.3, 340/856.4; 367/25, 911, 912; 250/268; 181/102, 401; 175/50

[56] References Cited

U.S. PATENT DOCUMENTS

| | | | |
|---|---|---|---|
| 4,578,789 | 3/1986 | Gelfand | 367/35 |
| 4,693,335 | 9/1987 | Alman | 181/102 |
| 4,811,814 | 3/1989 | Staron et al. | 181/108 |
| 5,016,727 | 5/1991 | Wittrisch | 181/102 |
| 5,092,423 | 3/1992 | Petermann | 181/102 |
| 5,189,262 | 2/1993 | Engler et al. | 181/102 |
| 5,200,581 | 4/1993 | Boyle et al. | 367/911 |
| 5,243,562 | 9/1993 | Laurent et al. | 367/25 |
| 5,318,129 | 6/1994 | Wittrisch | 367/86 |

FOREIGN PATENT DOCUMENTS

| | | |
|---|---|---|
| 0457644 | 11/1991 | European Pat. Off. . |
| 2501380 | 9/1982 | France . |
| 2636741 | 3/1990 | France . |
| 2230091 | 10/1990 | United Kingdom . |
| 9113233 | 9/1991 | WIPO . |

*Primary Examiner*—Nelson Moskowitz
*Attorney, Agent, or Firm*—Antonelli, Terry, Stout & Kraus

[57] ABSTRACT

The mobile seismic system according to the invention is made up by interconnecting reception sections (T1) and of anchoring sections (T2), and possibly emission sections, the assembly being suspended in the well by means of an electro-carrying cable (3). The first sections (T1), which are filled with liquid, are delimited at least partly by a wall transparent to acoustic waves. They contain each one or several hydrophones and an electronic module of acquisition of the signals picked up. The second sections (T2) comprise a body provided with retractable anchoring means (13) and with motor means, either autonomous, or connected, by a hydraulic line running along the reception system, to common motor means located preferably in a lower section so as to be used as a ballast weight. The reception system may be continuous or made up of several parts connected to each other by electric or electro-hydraulic linking means. The system is suitable for seismic prospecting in wells for example.

2 Claims, 3 Drawing Sheets

FIG. 8A  FIG. 9  FIG. 10  FIG. 11  FIG. 12
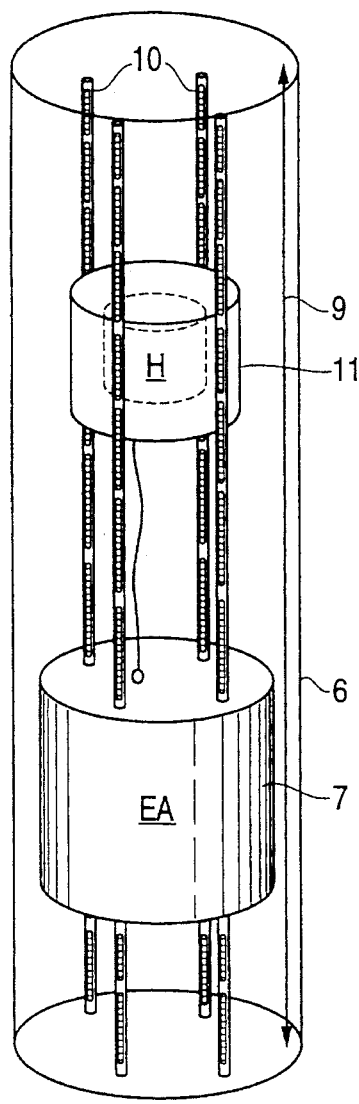
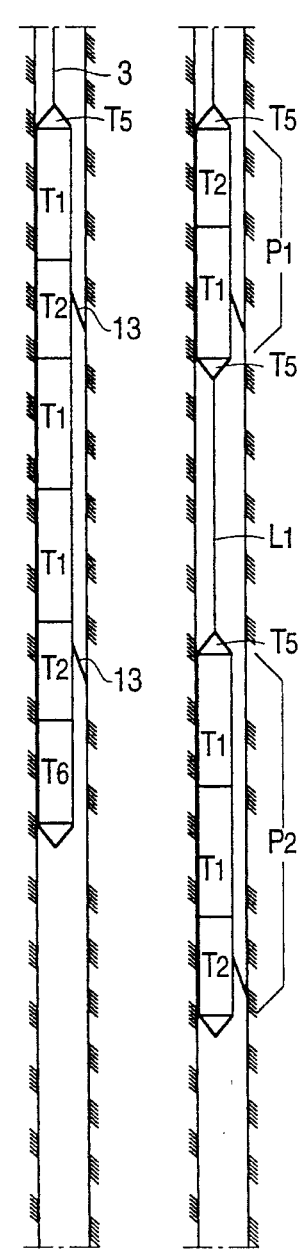
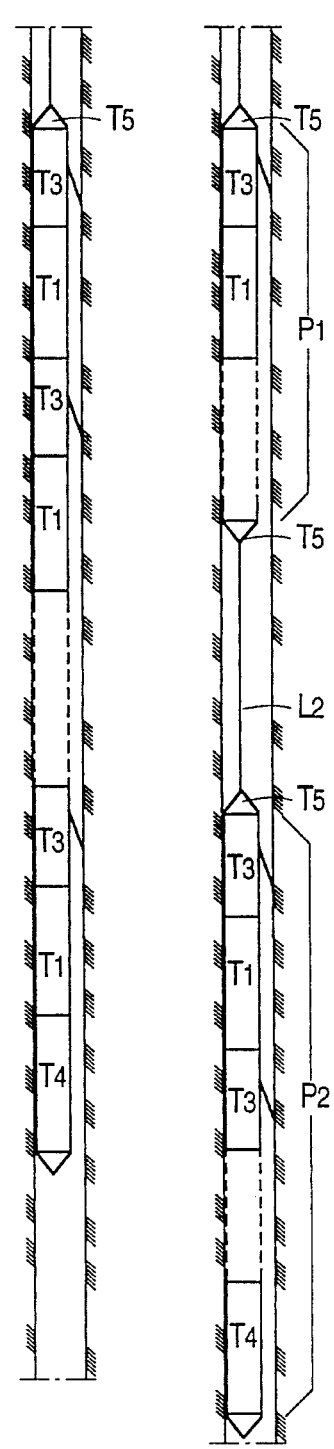

MOBILE SEISMIC SYSTEM OF GREAT LENGTH FOR WELLS

BACKGROUND OF THE INVENTION

The invention relates to a seismic system suited for being lowered into a well for the reception of acoustic or seismic waves, and more particularly to a seismic system for wells provided with a relatively great number of sensors distributed over a great length.

Systems suitable notably for the reception of acoustic or seismic waves for wells generally comprise one or several reception units connected to each other, lowered into a well at the end of a multiwire electro-carrying cable connected to a surface installation. Each of these reception units comprises a sealed enclosure associated with anchoring means enabling the enclosure to be applied against a portion of the well wall and one or several geophones, possibly triaxial, to be coupled with the surrounding geologic formations. The various sensors may be connected separately to the surface installation so as to transmit the signals they pick up. More frequently, they are connected to a signal acquisition device located in the reception unit at the top of the reception system. This device collects by multiplexing, digitizes and stores the signals coming from all the sensors of the reception system, before transmitting them in a coded form to a surface control and recording set.

Such reception systems are for example described in U.S. Pat. Nos. 4,428,422, 4,874,060, 4,862,425, 4,901,289 or French Patents FR 2,564,599 or 2,636,741 assigned to the same applicant.

Said known seismic systems implement seismic prospecting methods where seismic signals reflected by the discontinuities of a surveyed subsoil in response to the emission of seismic pulses in the subsoil by means of a source arranged at the surface, in another well or in the same well, are picked up simultaneously in a limited number of depths, and where the system is moved successively in a great number of depths along the well, so as to multiply for each sensor the number of reception locations.

The previous seismic systems may give satisfactory results provided that the well through which the array of sondes used is run is available long enough to perform seismic emission-reception cycles in all the successive locations selected and thereby compensate for the small number of sensors. This is a great handicap in wells of limited availability such as production wells.

SUMMARY OF THE INVENTION

The seismic system according to the invention is suited for the acquisition in wells of a great volume of data during relatively short periods so as to minimize the unavailability time of wells for production.

It comprises in combination an elongate element delimited over at least part of the length thereof by a wall transparent to acoustic waves (such as a supple sheath), this part being filled with liquid, means for anchoring the elongate element in the well such as anchor arms or shoes for example, at least one geophone arranged in the elongate element so as to be coupled with the formations surrounding the well by action on the mobile anchoring means, one and preferably several hydrophones arranged in each of the parts of the elongate element provided with a wall transparent to acoustic waves, an electro-carrying cable to connect the elongate element to a surface control and recording station, motor means to actuate the mobile anchoring means and an electronic assembly for the acquisition, the storage and the transmission of the signals received by each hydrophone and each geophone of the elongate element, in order to control the motor means and manage communications with said surface control and recording station.

The elongate element may comprise anchoring means arranged in various places along the elongate element and actuated by motor means, either common or separate, located for example in one or several rigid parts of the elongate element.

The seismic system according to the invention may comprise several sections connected end to end or several parts joined by connection means such as electric conductors and possibly one or several hydraulic lines.

The motor means comprise for example a hydraulic assembly driven by an electric motor and electric conductors for connecting the motor to the electrocarrying cable.

The motor means may also comprise several autonomous hydraulic assemblies driven separately each by an electric motor connected to the electrocarrying cable.

The hydraulic assembly, when there is a single one, is located for example towards the end of the elongate element opposite the electrocarrying cable, so as to ballast the reception system.

The electronic acquisition, control, management and transmission assembly may comprise several electronic units arranged in various sections of the reception system.

According to one embodiment, the seismic system according to the invention comprises at least one section including two elongate parts filled with liquid, delimited externally by a supple wall and containing each a group of hydrophones arranged at a distance from one another, the two parts being connected to each other by a tubular part containing a local electronic acquisition unit.

The seismic system comprises for example several sections provided each with end fittings and suited for being connected by fitting into each other, each of them being crossed lengthwise by a plurality of electric lines, and electric connection means for linking electrically the lines of the various sections together.

Each section of at least part of the various sections of the elongate element may also be crossed by a hydraulic line, the end fittings being provided with retractable closing means so as to communicate automatically the respective hydraulic lines of adjoining sections when they fit into each other.

The seismic system may also comprise one or several sections containing means for emitting acoustic or seismic signals.

By interconnecting several sections containing each several hydrophones and/or geophones, it is possible to constitute a mobile seismic assembly or well streamer of great length which may contain for example 100 reception levels or more, distributed over a zone of great depth, and therefore to achieve seismic prospecting operations on a relatively large scale in wells, much more rapidly than with the prior devices having a limited number of reception locations.

BRIEF DESCRIPTION OF THE DRAWINGS

Other features and advantages of the seismic system according to the invention will be clear from reading the description hereafter of embodiments given by way of non limitative examples, with reference to the accompanying drawings in which:

FIGS. 9 and 10 show two arrangements of the reception system suited for the embodiments provided with a small number of anchoring sections, and FIGS. 11 and 12 show two other arrangements suited for embodiments utilizing a relatively great number of anchoring sections.

DESCRIPTION OF THE PREFERRED EMBODIMENTS

Figure 1:
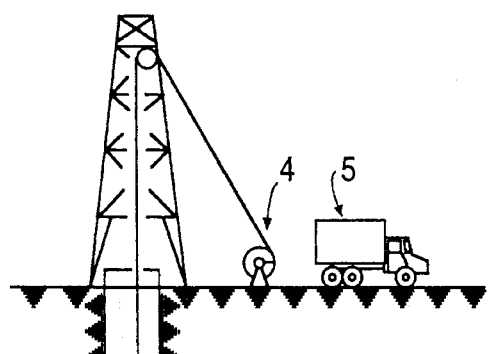
FIG. 1 diagrammatically shows the reception system positioned in a well.

The reception system 1 according to the invention is suited for being lowered into a well or borehole 2 suspended by an electro-carrying cable 3. Surface operating means 4 co-operate with cable 3 so as to lower and take up the reception system at will. The electrocarrying cable 3 of a well-known type comprises a plurality of conducting lines (7 for example) connected to a mobile control and recording set 5. The reception system comprises generally several sections interconnected to each other as described hereafter.

Figure 2:
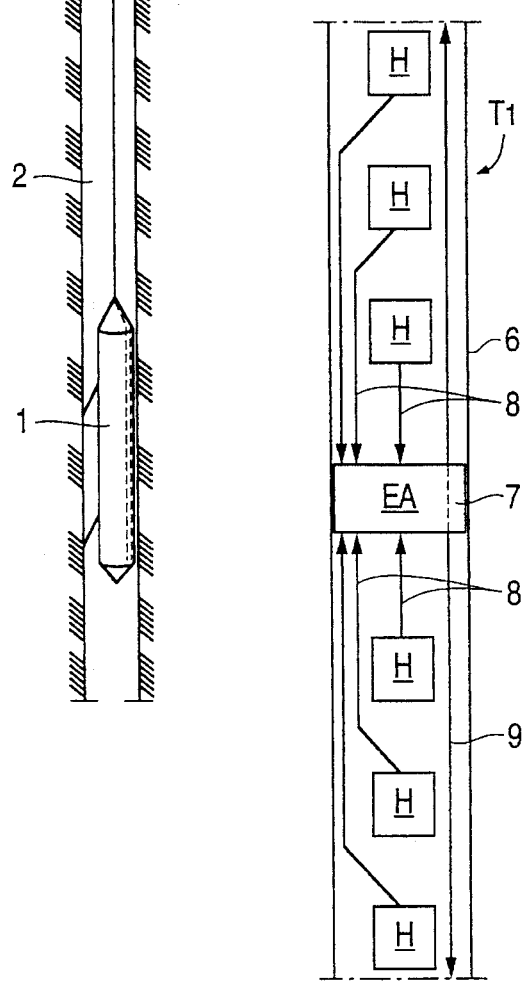
FIG. 2 diagrammatically shows an embodiment of a reception section containing hydrophones and an electronic acquisition module, FIG. 3 diagrammatically shows a first embodiment of an autonomous reception and anchoring section, FIG. 4 diagrammatically shows a second embodiment of a dependant reception and anchoring section, FIG. 5 diagrammatically shows an end section containing a common hydraulic assembly.

The reception and acquisition section T1 schematized in FIG. 2 comprises a supple sheath 6 transparent to acoustic waves, whose length may range, according to the applications, from several meters to several ten meters. An electronic signal acquisition unit 7 is arranged towards the middle of section T1. Hydrophones H connected by electric conductors 8 to the acquisition unit 7 of section T1 are located inside and evenly spaced out along sheath 6. Electric or electrohydraulic connection means 9, which will be defined in relation to FIGS. 6 to 12, run along sections T1.

Several cables 10 (FIGS. 8, 8A) run along each section T1 and sustain the mechanical stresses. The housings 11 of hydrophones H are fastened onto these cables 10 at a distance from one another. According to the embodiment of FIG. 8, the local electronic unit 7 lies in a housing 7A fastened to the outer sheath by means of clamps 7B. It provides a sealed partition between the two parts of the section on either side and the cables 10 of these two parts are fastened thereto. Sealed passageways provided through the housing of unit 7 allow the assembly 9 of electric conductors and/or of hydraulic lines to pass from one side of the section to the other.

According to the embodiment of FIG. 8A, the cross-section of the housing 7A of electronic unit 7 is smaller than that of the outer sheath 6. The two parts of the section on either side of the housing communicate. Housing 7 is fastened onto the traction cables 10 and connection assembly 9 (electric wires and lines) passes through the annular space between the housing and outer sheath 6.

The sections T1 constituted thereby are filled with a liquid such as insulating oil.

Figure 3:
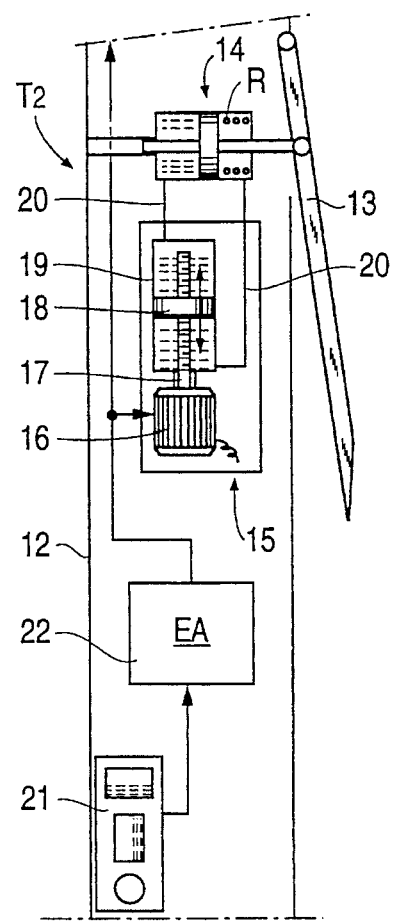

The autonomous reception and anchoring section T2 schematized in FIG. 3 comprises a rigid body 12 and a mobile arm 13 which may pivot, under the action of a jack 14, between a folded position where it leans against the body and an open position where it anchors against the wall of the well. The jack is driven through the application of a hydraulic fluid produced by a local hydraulic assembly 15 such as that described in patent FR-2,501,380. This assembly comprises for example an electric motor 16 driving an endless screw 17 and a piston 18 moved in a cylinder 19 filled with oil through the rotation of screw 17, and lines 20 connecting cylinder 19 to the cylinder of jack 14. A local electronic unit 22 analogous to acquisition unit 7, but suited for controlling also the activation of the anchoring means and notably of the electric motor, is arranged in the body 12 of section T2. One or several geophones 21, for example a triaxial geophone, may also be placed in body 12, and the local electronic unit 22 further comprises in this case circuits for the acquisition, the storage and the transmission of the signals picked up.

Figure 4:
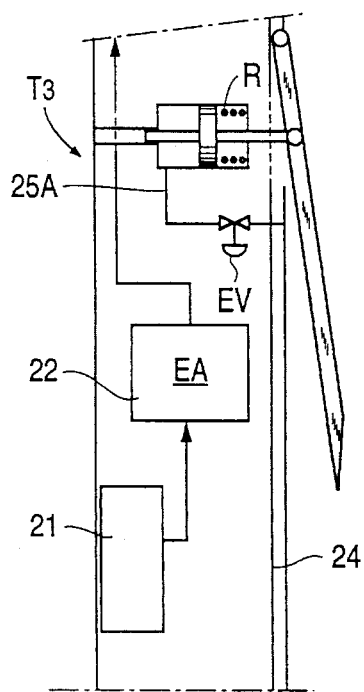
Figure 8:
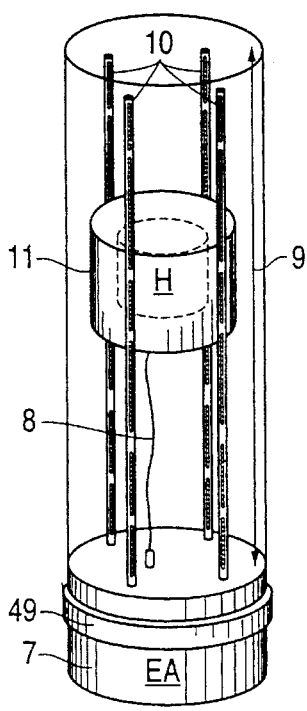

The dependant reception and anchoring section T3 schematized in FIG. 4 is analogous to the previous section, except that it comprises no local hydraulic assembly such as assembly 15 above, the cylinder of the jack being here linked by means of a branch circuit 25A to a line 24 running along the section (FIG. 6) and connected for example to a general hydraulic system 25 which is made up similar to the hydraulic system 15. A solenoid valve EV may be added onto line 25A so as to be able to control selectively the opening of the anchor arm in case several of them are placed along the elongate element. Solenoid valve EV is controlled by means of the local electronic unit 22.

Each hydraulic system comprises preferably automatic means for compensating the variations in the static pressure prevailing in the well, such as those described for example in the above cited U.S. Pat. No. 4,428,422.

The general hydraulic system 26 is located for example (FIG. 5) in an end section T4 of the reception system 1 so as to facilitate through the mass thereof the downward progress of the reception system. At least one motion sensor C such as a seismic type accelerometer or a geophone is also preferably placed in this end section T4, with an electronic acquisition unit 7 in order to detect any anomaly in the progress of the reception system along the well, for example due to sticking, as described in patent FR-2,613,496 cited above.

An end section T5 containing a ballast weight intended to facilitate the progress of the seismic system along the well may also be used. This section T5 may be simply passive, but it is also possible to place a seismic type accelerometer or a geophone associated with an electronic unit 7 therein, as described above.

One or possibly several sections of the seismic system according to the invention may also contain a seismic source of any type and for example a vibrator such as that described for example in patent application FR-90/12,472 or in patent FR-2,656,110 filed by the applicant. A local electronic control module 22 is then associated with this seismic source.

Figure 6:
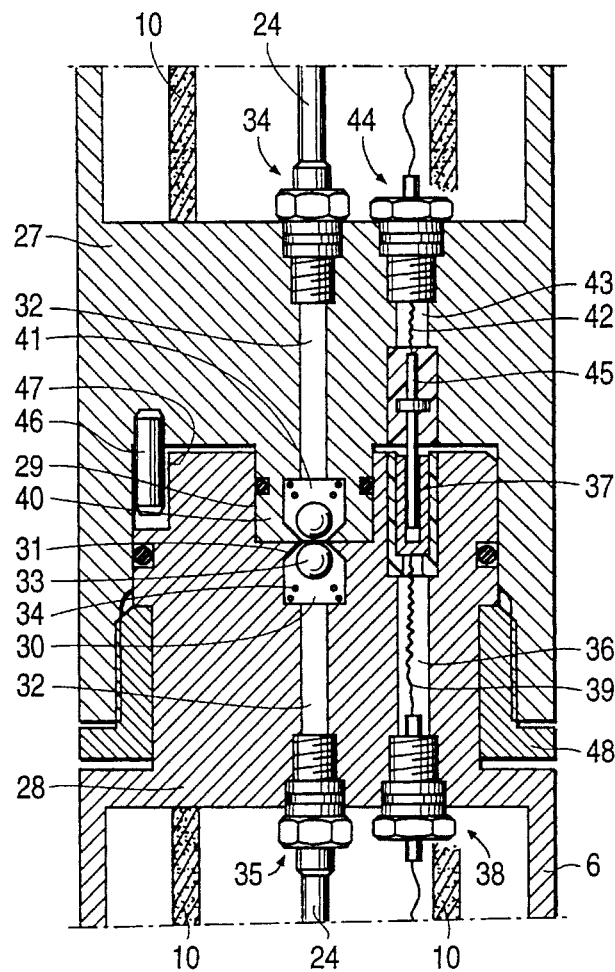
FIG. 6 is a longitudinal section of a zone of fitting in of two successive sections of the reception system.
Figure 7:
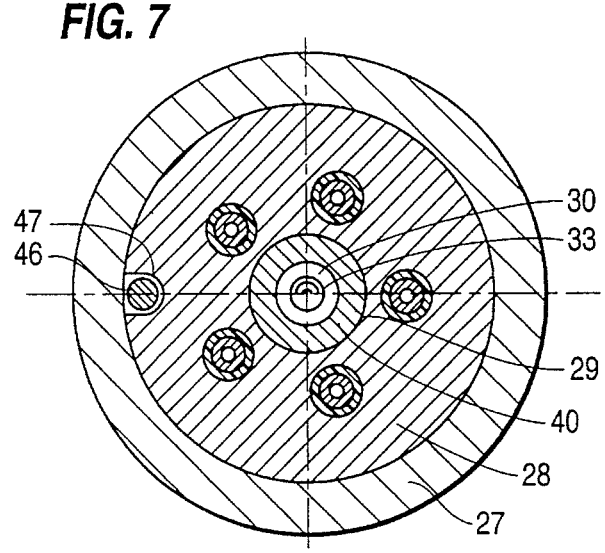
FIG. 7 is a cross-section of the lay-out of the electric and hydraulic lines in a zone of connection of two sections, FIGS. 8 and 8A diagrammatically show the lay-out of various elements inside a reception and acquisition section.

Interconnection of the successive sections of the reception system is achieved according to the embodiment of FIG. 6 for example. Each section T1, T2, T3 or T4 comprises at the lower end thereof a connecting sleeve 27 and at the opposite end thereof a male end fitting 28 suited for fitting into the corresponding sleeve 27 of an adjoining section. A cylindric cavity 29 is provided in the end wall of each male end fitting 28 and along the axis thereof. A chamber 30 communicating with cavity 29 through a truncated opening 31 runs on from this cavity 29 and communicates with the inside of the section through a bore 32. The truncated opening 31 is used as a seat for a ball 33 located in chamber 30. A spring 34 holds it against its seat. A shank 35 integral with line 24 crossing the section over the total length thereof is screwed on the lower end of bore 32. The end wall of end fitting 28 is crossed right through by several channels 36 arranged in rings (FIG. 7) around the central cavity 29 and parallel to the axis thereof. These channels are closed at the outer end thereof by an electric plug 37 or, as the case may be, a multipoint pin connector, and they are insulated from the inside of the section at their opposite end by sealing means 38 of the type allowing sealed passage of one or several electric wires 39 or sealed ducts.

Each connecting sleeve 27 comprises an axial cylindric extension 40 provided in the central part thereof with a chamber 41 analogous to chamber 30 and communicating similarly with the outside through a truncated opening 31 providing a seat for a ball 33 asociated with a spring 34. The wall at the bottom of connecting sleeve 27 is also crossed right through by a plurality of channels 42 for the passage of one or everal electric wires 43. These wires enter the section similarly through sealed ducts 44 and they are connected to a socket 45 or to a multipoint connector as the case may be. The various plugs and sockets of the adjoining sections are arranged so as to connect into one another when they are fitted together. An indexing key 46 is fastened at the bottom of the sleeve and the end fitting is provided with a recess 47 allowing a correct angular positioning of these two elements while they are fitted into each other, and consequently a correct connection of the various conducting lines 39, 43. Similarly, chamber 41 at the bottom of sleeve 27 is also extended by a channel 32 to which a line 24 may be connected as described previously, by means of a shank 34.

Figure 5:
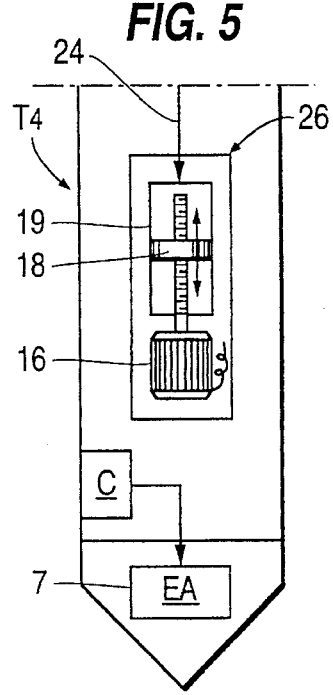

Cables 10 (FIG. 8) are fastened on the inner walls of sleeve 27 and of end fitting 28. A ring 48 threaded externally and integral in translation with the male end fitting 28 is suited for screwing onto an inner threaded part of sleeve 27 by translating end fitting 28 towards its position of total fitting therein. In this position, the balls 33 of end fitting 28 and of sleeve 27 are placed opposite one another and their seats are so shaped that they project outside the two chambers 30. Consequently, when the sections are connected together, balls 33 repel mutually and communicate the opposite chambers 30 with each other. It is therefore possible, by assembling sections, to communicate the dependant anchoring sections such as T3 together through the common line 24 and thereby with the general hydraulic system 25 in a section such as T4 (FIG. 5).

According to a simplified embodiment, assemblings may be performed with sleeves 27 and end fittings 28 without retractable hydraulic intercommunication means such as those described above, if several sections having autonomous motor means, such as sections T2 (FIG. 3), are for example placed along the reception system.

According to another embodiment which is not shown, it is also possible to use connecting sleeves and end fittings comprising a common electric connector to which all the electric conductors such as 39, 43 are connected, and a separate hydraulic connector for the hydraulic line sections 24.

The whole of the electric conductors 38, 42 and, in some cases, the common hydraulic line 24 constitute the connection means 9 defined previously.

Various configurations may be obtained by interconnecting the previous various types of sections.

The embodiments of FIGS. 9 and 10 comprise autonomous anchoring sections of T2 type. The reception system is for example obtained through the continuous interconnection of one or several sections of T1 type (FIG. 2) and of at least one autonomous anchoring section such as T2 (FIG. 3), this assembly being fastened at a first end below a connecting section T5 integral with the electrocarrying cable 3 and, at the opposite end thereof, to an end section T6 provided with a ballast weight.

According to the embodiment of FIG. 10, the reception system consists of at least two sub-assemblies, each of them comprising at least one section such as T1. One of the two sub-assemblies at least comprises an autonomous anchoring section of T2 type. The two parts of the reception system are connected respectively to connecting sections T5 linked together by an electrocarrying cable L1 analogous to electrocarrying cable 3.

The embodiments of FIGS. 11 and 12 are more particularly suited when the reception system comprises a relatively great number of anchoring sections.

According to the embodiment of FIG. 11, continuous interconnection of several sections such as T1 is achieved by interposing in various places of the length thereof several dependant anchoring sections of T3 type, and by connecting the assembly to a section of T4 type capable of supplying all the dependant anchoring sections T3 with hydraulic fluid via the common line 24. In this case, intermittent connection means for sections with hydraulic intercommunication such as those shown in FIG. 6 for example are used. Section T4 is preferably positioned so as to ballast the reception system and to facilitate the progress thereof along the well.

According to the embodiment of FIG. 12, an analogous reception system made up of two or several sub-assemblies P1, P2 comprising each one or several sections of T1 type and one or several sections of T3 type communicating hydraulically with each other is achieved, the various sub-assemblies being linked together by means of electrohydraulic cables L2 and coupling sections of T5 type. The common hydraulic means are also arranged preferably at the base of the reception system constituted in a section of T4 type.

According to a preferred embodiment, the various electronic units 7 or 22 are located in the various sections of the seismic system for controlling the acquisition of the signals picked up and for controlling motor means where the seismic emission means are linked to the surface control and recording station by a transmission system of the type described in patent applications FR-2,685,093 or 92/03,575 filed by the applicant. The electronic units 7 or 22 are provided each with an addressable monitoring module comprising means for decoding control signals. All these monitoring modules are permanently connected to the central station by common lines (conducting wires or optical fibers) of the electrocarrying cable and of the conductor bunch 39, 43 running along the elongate element, the various electronic units 7, 22 may be connected selectively to other lines of conductor bunch 39, 43 and of the electrocarrying cable 3, through switching means actuated when the monitoring module included therein decodes an instruction which is addressed thereto from the surface control station 5. By means of this selective connection, it may then be provided with electric current to supply the motor means or possibly a seismic source, or to transmit acquired and stored data towards this station 5.

According to another embodiment, the units 7, 22 associated with the hydrophones and the geophones are for example of the type described in the above cited U.S. Pat. No. 4,901,289 cited above and comprise means for digitizing and storing the signals received, for decoding instructions addressed by the central control and recording station 5 at the surface, and in response, for coding the responses, notably the data stored, before transmitting them towards the surface.

According to another embodiment, an electronic acquisition unit 7, 22 is arranged in each section and communicates with an electronic communication module located for example in section T5 at the top of the seismic system, which is not shown, this module comprising coding means for decoding the instructions received through the electrocarrying cable 3 before they are transferred towards the various electronic units 7, 22 along the reception system, and for coding the data acquired before they are transmitted through the same electrocarrying cable 3.

A seismic system of a length ranging from several ten to several hundred meters, possibly capable of supplying a surface recording station with several hundred different "traces" may thus be achieved in a continuous form (FIGS. 9, 11) or in a discontinuous form with several parts assembled by suited connection means (FIGS. 10, 12). Such a reception system allows more precise seismic records to be obtained while reducing substantially the time of occupation of the well.

Without departing from the scope of the invention, the anchor arms may be replaced by any other coupling means such as shoes or enclosures which may be applied against the wall of the well by expansion or by using electromagnets for applying the elongate element or anchor arms against the cased well wall.

Without departing from the scope of the invention, the electrohydraulic anchoring means described may also be replaced by other well-known means of the electromechanical type where the rotation of an endless screw such as 17 acts mechanically upon anchoring arms or shoes.

We claim:

1. A mobile seismic system for collecting seismic waves in a well, said waves emanating from a subterranean formation, which comprises several elongate elements provided each with an end fitting and a connecting sleeve and adapted for connecting together by fitting into each other, each of the elongate elements being cross lengthwise by a plurality of electric wires, and electric connection means for connecting electrically the electrical wires of the several elongate elements to one another; each elongate element of at least part of the several elongate elements being crossed by a hydraulic line, the end fittings and sleeves of said elongate elements being provided with retractable closing means so as to communicate automatically respective hydraulic lines of adjoining elongated elements when fit into each other; at least one first elongate element provided with mobile means for anchoring the at least one first elongate element in the well and with hydraulic motor means for actuating the mobile anchoring means, at least one geophone arranged at least in the at least one first elongate element for being coupled with formations surrounding the well by action on said anchoring means; an electro-carrying cable for connecting said at least one first elongate element to a surface control and recording station; an electronic assembly for acquiring, storing and transmitting received seismic signals, for controlling said motor means and for managing communications with said surface control and recording station; said seismic system also comprising at least one second elongate element coupled with said at least one first elongate element, said at least one second elongate element comprising an elongate cavity provided with a wall made of a supple material and filled with liquid, at least one hydrophone arranged in the cavity of said at least one second elongate element; electronic acquisition means connected with said electronic assembly in said at least one first elongate element for acquiring signals sensed by said at least one hydrophone and transmitting the signals to the electronic assembly; hydraulic cable means passing along the at least one second elongate element, and at least another elongate element including at least mobile anchoring means for anchoring the another elongate element in the well and hydraulic motor means for actuating the mobile anchoring means fed with hydraulic power.

2. A mobile seismic as claimed in claim 1, wherein the supple material is transparent to acoustic waves.

* * * * *